UNITED STATES PATENT OFFICE.

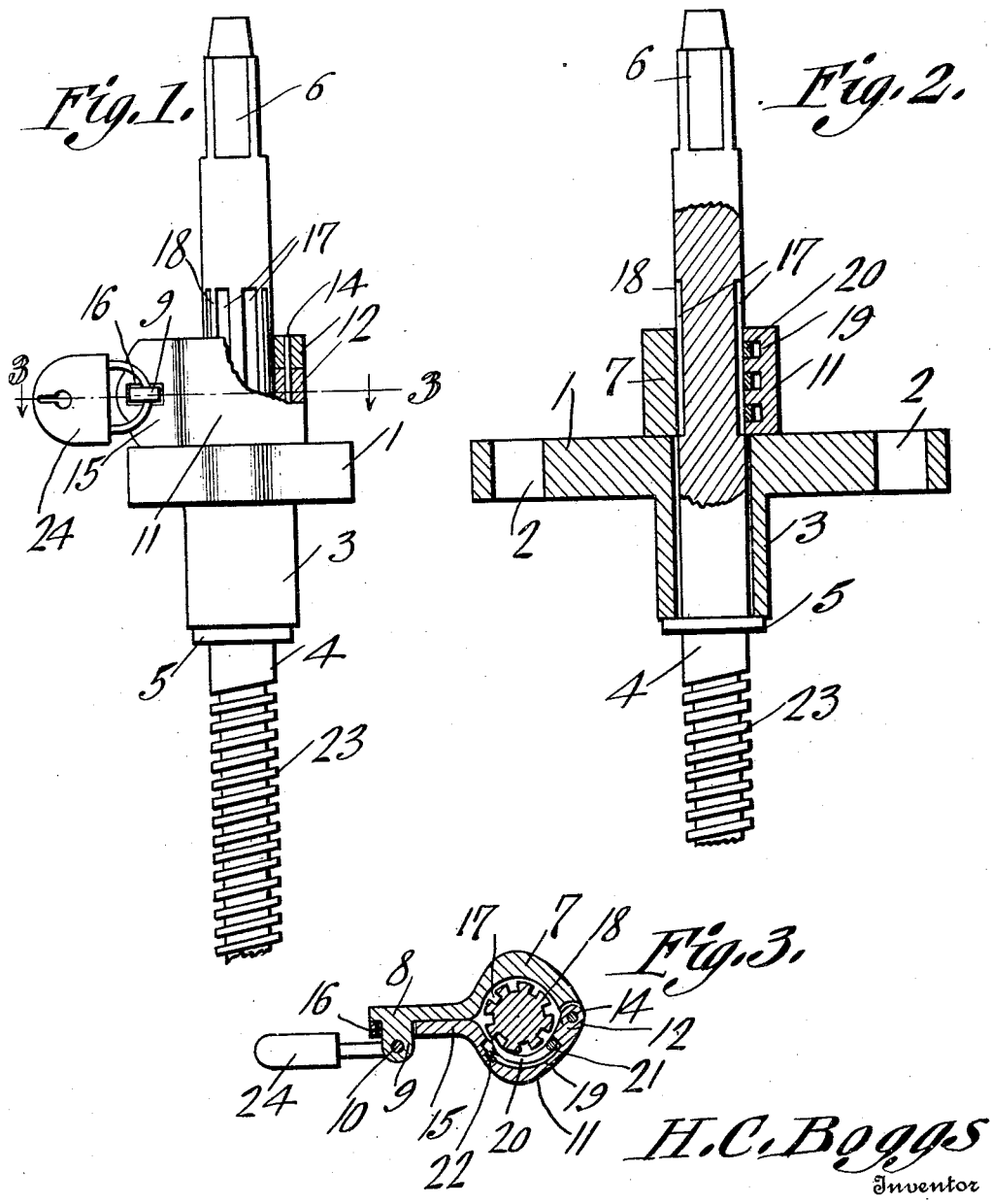

HENRY C. BOGGS, OF DEPEW, OKLAHOMA.

VALVE-LOCK.

1,258,306.                    Specification of Letters Patent.        Patented Mar. 5, 1918.

Application filed July 5, 1917. Serial No. 178,831.

*To all whom it may concern:*

Be it known that I, HENRY C. BOGGS, a citizen of the United States, residing at Depew, in the county of Creek and State of Oklahoma, have invented a new and useful Valve-Lock, of which the following is a specification.

It is the object of this invention to provide novel means whereby a valve stem may be locked against rotation, thereby preventing an unauthorized manipulation of the valve.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in elevation, a device constructed in accordance with the present invention, parts being broken away;

Fig. 2 is a longitudinal section;

Fig. 3 is a section taken on the line 3—3 of Fig. 1, remote parts being omitted.

The numeral 1 indicates a support of any desired kind, such as a cap plate, having openings 2 adapted to receive securing elements (not shown) whereby the cap plate 1 may be mounted on the end of a valve casing. The cap plate 1 has a depending bearing 3. Journaled for rotation in the bearing 3 and in the cap plate 1 is a stem 4 having a shoulder 5 which may coact with the lower end of the bearing 3. The lower or inner end of the stem 4 is threaded as shown at 23 to coact with a valve (not shown). The upper end of the stem 4 is of polygonal form, to receive any suitable means for rotating the stem, the polygonal portion of the stem being denoted by the reference character 6.

The stem 4 is surrounded, exteriorly of the cap plate 1, by a collar, comprising a fixed part 7 which may be formed integrally with the cap plate 1. The fixed part 7 of the collar has a laterally projecting arm 8 which also is formed integrally with the cap plate, the arm 8 carrying a tongue 9 provided with an opening 10. The collar above mentioned includes a movable part 11. The part 11 of the collar and the part 7 thereof are provided with coöperating knuckles 12, connected by a pivot pin 14, the construction being such that the movable part 11 of the collar may be swung toward and away from the fixed part 7 of the collar, in a direction parallel to the cap plate 1. The movable part 11 of the collar has an arm 15 adapted to abut against the arm 8 of the fixed part 7 of the collar, the arm 15 having an opening 16 through which the tongue 9 of the fixed part 7 of the collar passes.

The stem 4 is provided with longitudinal slots 17 defining longitudinal ribs 18. In the movable part 11 of the collar, internal transverse recesses 19 are formed. Curved pawls 20 are located in the recesses 19. The pawls 20 at one end are pivoted as shown at 21 to the movable part 11 of the collar. Springs 22 are interposed between the free ends of the pawls 20 and the movable part 11 of the collar, the springs being located in the recesses 19, and serving to swing the free ends of the pawls inwardly, so that the said free ends of the pawls will coact with the ribs 18 on the stem 4.

In practical operation, when the parts are arranged as shown in Fig. 3, the free ends of the pawls 20, coact with the ribs 18 on the stem 4 and prevent an unauthorized rotation of the stem 4, and a consequent unauthorized manipulation of the valve which is assembled with the stem. A locking device 24 is engaged through the opening 10 in the tongue 9, and serves to hold the arms 15 and 8 together, so that the arm 15 cannot be swung outwardly, thereby permitting a disengagement of the pawls 20 from the ribs 18 in the stem 14. When it is desired to rotate the valve stem 14, the locking device 24 is disengaged from the tongue 9, and then the movable part 11 of the collar may be swung away from the fixed part 7 of the collar, thereby disengaging the pawls 20 from the ribs 18 on the stem 4, whereupon the stem 4 may be rotated in the usual manner, to manipulate the valve which is assembled with the threaded portion 23 of the stem.

It is to be observed that the slots 17 and the ribs 18 are prolonged beyond the outer or upper end of the collar 7—11. As a consequence, the locking operation above described may be carried out, should the stem 4 be of that general type which has a slight longitudinal movement during the manipulation of the valve.

Having thus described the invention, what is claimed is:—

1. In a device of the class described, a supporting structure; a collar comprising a part carried by the supporting structure, and a part movable with respect to the supporting structure; means for locking the parts of the collar together; a pawl carried by the movable part of the collar; and a valve stem journaled in the supporting structure and in the collar, the valve stem having a ratchet wherewith the pawl engages.

2. In a device of the class described, a supporting structure; a collar including pivotally connected parts, one of which parts is secured to the supporting structure, the other of which parts is movable with respect to the supporting structure, both of said parts having arms, one arm being provided with an opening, and the other arm being provided with a tongue projecting through the opening, the tongue having an aperture adapted to receive the locking means; a pawl carried by the movable part of the collar; and a valve stem journaled in the supporting structure and in the collar, the valve stem having a ratchet wherewith the pawl coacts.

In testimony that I claim the foregoing as my own, I have hereto affixed my signature in the presence of two witnesses.

HENRY C. BOGGS.

Witnesses:
FRED A. SPEAKMAN,
J. H. SAVAGE.

Copies of this patent may be obtained for five cents each, by addressing the "Commissioner of Patents, Washington, D. C."